Patented Jan. 5, 1937

2,066,986

UNITED STATES PATENT OFFICE 2,066,986

WATER-INSOLUBLE AZODYESTUFFS

Wilhelm Lamberz, Leverkusen-Wiesdorf, Germany, assignor to General Aniline Works, Inc., New York, N. Y., a corporation of Delaware No Drawing. Application February 19, 1934, Serial No. 712,073. In Germany March 1, 1933

8 Claims. (Cl. 260—95)

The present invention relates to new water-insoluble azodyestuffs and to fibres dyed with the same, more particularly it relates to azodyestuffs which may be represented by the probable general formula:

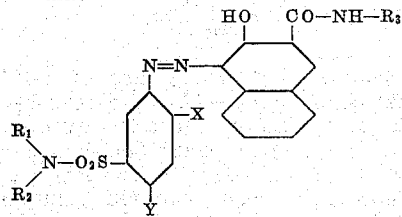

wherein $R_1$ stands for alkyl or an aralkyl radical, such as methyl, ethyl or benzyl which may bear non-solubilizing substituents in the benzene nucleus, such as alkyl, halogen and alkoxy, and $R_2$ stands for alkyl, an aryl, aralkyl or hydroaromatic radical, such as a radical of the benzene series which may bear non-solubilizing substituents, or the radical of hexahydrobenzene, or the group—

stands for the radical of a hydrogenated ring system containing nitrogen, such as for the radical of piperidine, pyrrolidine, β-methylpyrrolidine and the like, $R_3$ stands for an aromatic nucleus, such as a benzene nucleus, containing as substituent an alkoxy group, such as a methoxy or ethoxy group and which nucleus may bear further non-solubilizing substituents, such as halogen, alkoxy or alkyl, and X and Y stand for halogen, a methyl or an alkoxy group.

My new dyestuffs are obtainable by diazotizing in the usual manner an aromatic amine of the general formula:

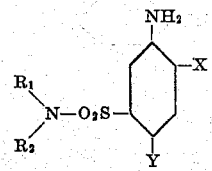

wherein $R_1$, $R_2$, $x$ and $y$ mean the same as stated above, and coupling with a 2,3-hydroxynaphthoic acid arylamide containing in the aryl nucleus of the arylamide radical as substituent an alkoxy group and which aryl nucleus may bear further non-solubilizing substituents.

The coupling may be performed in substance or on a substratum, especially on cellulosic fibres, such as cotton or regenerated cellulose. Those dyestuffs prepared in substance are generally orange to dark red colored powders, while the dyestuffs prepared on the fibre, for example, according to a printing process or to the known methods of preparing ice colors, generally yield orange to Bordeaux shades of good fastness properties, especially a good fastness to light.

The bases used in the manufacture of my new dyestuffs are obtainable, for example, by condensing the corresponding nitroarylsulfonic acid chlorides with the corresponding secondary amines, followed by reduction of the nitro group to the amino group.

The invention is illustrated by the following examples, without being limited thereto:

MANUFACTURE OF THE DYESTUFF ON THE FIBRE

Example 1

*Impregnating bath*:—4 grams of 1-(2′,3′-hydroxynaphthoylamino)-2,5-dimethoxybenzene are pasted with 8 ccs. of Turkey red oil and 10 ccs. of aqueous caustic soda lye of 38° Bé. strength. To the paste 80 ccs. of boiling water are added, and if necessary, the dyestuff is dissolved to a clear solution by boiling. By adding 80 ccs. of cold water, the solution is cooled down to 50° C., then 3 ccs. of an aqueous formaldehyde solution of 30% strength are added and after standing for 20 minutes, the bath is filled up with water to one litre.

*Developing bath*:—2.7 grams of 4-amino-1,3-dimethylbenzene-6-sulfonic acid diethylamide (colorless crystals of the melting point 111° C., obtainable by condensing 4-nitro-1,3-dimethylbenzene-6-sulfonic acid chloride and diethylamine, followed by reduction of the nitro group to the amino group) are dissolved with 25 ccs. of warm water and 5 ccs. of hydrochloric acid of 20° Bé. The solution is then cooled to 15° C., and thereto are added, while stirring, 0.75 gram of sodium nitrite of 98° strength, dissolved in a little water. After standing for 10 minutes, the excess hydrochloric acid is neutralized by the addition of sodium acetate, and the bath is filled up with water to one litre.

*Dyeing direction:*—50 grams of well boiled cotton yarn are impregnated in the impregnating bath at about 30° C. for about 20 minutes, squeezed and introduced for about ½ hour into the developing bath, rinsed, soaped in a boiling bath, again rinsed and dried. Thus is obtained a clear yellowish red shade of good fastness to light, combined with an excellent fastness to chlorine, washing and boiling in aqueous soda and caustic soda solution. The dyestuffs corresponds to the following formula:

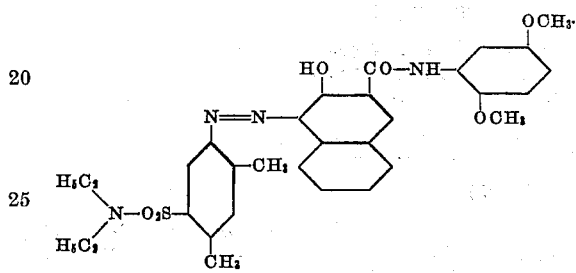

*Manufacture of the dyestuff in substance:*— 2.7 grams of 4-amino-1,3-dimethylbenzene-6-sulfonic-acid-diethylamide are diazotized in the usual manner. The diazo solution is coupled with 3.3 grams of 1-(2',3'-hydroxynaphoylamino)-2,5-dimethoxybenzene, dissolved in a solution of Turkey red oil in dilute aqueous caustic soda lye, to which solution sodium acetate has been added in a quantity sufficient for binding the excess mineral acid. The dyestuff separating from the solution is filtered and well washed. After drying, it is obtained in form of a scarlet red powder which is soluble in concentrated sulfuric acid with a reddish-violet coloration.

The coupling can also be performed in the presence of a substrate generally used in the manufacture of lakes, such as barium sulfate.

Example 2

*Impregnating bath:*—5 grams of 1-(2',3'-hydroxynaphthoylamino-)-2-methyl-4-methoxybenzene are pasted with 10 ccs. of Turkey red oil and 6.25 ccs. of aqueous caustic soda lye of 38° Bé. and dissolved by adding 75 ccs. of boiling water. The solution is cooled down to about 50° C. by the addition of 75 ccs. of cold water. Then 5 ccs. of aqueous formaldehyde solution of 33% strength are stirred in, and after standing for 5 minutes the bath is filled up with cold water to one litre.

*Developing Bath:*—3.4 grams of 4-amino-1,3-dimethoxybenzene-6-sulfonic acid-N-methylbenzylamide (colorless crystals of the melting point 157–158° C., obtainable by condensing 4-nitro-1,3-dichlorobenzene-6-sulfonic acid chloride with methylbenzylamine, substitution of the two chlorine atoms by methoxy groups and reduction of the nitro group to the amino group) are diazotized as described in Example 1.

The dyeing is performed as described in Example 1. Thus are obtained clear Bordeaux shades which exert good fastness properties, especially a high fastness to light and a good fastness to chlorine and boiling in aqueous soda and caustic soda solution. The dyestuff corresponds to the following formula:

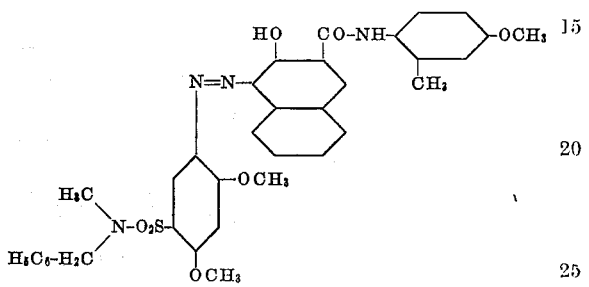

The dyestuff prepared in substance represents a Bordeaux colored powder, soluble in concentrated sulfuric acid with a blue coloration.

Example 3

*Impregnating bath:*—4 grams of 1-(2',3'hydroxynaphthoylamino)-2,4-dimethoxy-5-chlorobenzene are dissolved in a mixture consisting of 8 ccs. of denaturized alcohol, 2 ccs. of aqueous caustic soda lye of 38° Bé., 4 ccs. of water, 4 ccs. of aqueous bone glue solution 1:10, and 4 ccs. of aqueous formaldehyde solution of 33% strength. This solution is stirred into half a litre of water containing 10 ccs. of aqueous caustic lye of 38° Bé., 6 grams of Turkey red oil and 2 grams of bone glue, and the bath is filled up with water to one litre.

*Developing bath:*—3.2 grams of 4-amino-3-methyl-1-methoxybenzene-6-sulfonic acid-N-methylbenzylamide (colorless crystals of the melting point 124–125° C. obtainable by condensing 4-acetamino-3-methyl-1-methoxybenzene-6-sulfonic acid chloride (compare U. S. Patent 1,955,887, patented April 24, 1934) with benzylphenylamine, followed by splitting off of the acetyl group by saponification with a dilute mineral acid are treated as described in Example 1.

The dyeing is performed as described in Example 1. Thus are obtained bluish-red shades of excellent fastness properties. The dyestuff corresponds to the following formula:

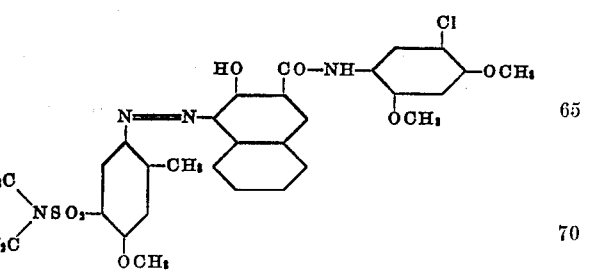

The dyestuff prepared in substance represents a red powder, soluble in concentrated sulfuric acid with a bluish-violet coloration.

Example 4

*Impregnating bath:* that of Example 3.—*Developing bath:*—2.9 grams of 4-amino-3-methyl-1-chlorobenzene-6-sulfonic acid-piperidide (colorless crystals of the melting point 148° C., obtainable by condensing 4-acetamino-3-methyl-1-chlorobenzene-6-sulfonic acid chloride (compare U. S. Patent 1,955,887, patented April 24, 1934) with piperidine and splitting off the acetyl group by saponification with a dilute aqueous mineral acid) are dissolved to a bath as described in Example 1. Dyeing is performed as described in Example 1. Thus are obtained clear reddish-Bordeaux shades of good fastness to boiling in aqueous caustic soda lye combined with a very good fastness to chlorine, light, washing and boiling in aqueous soda solution. The dyestuff corresponds to the following formula:

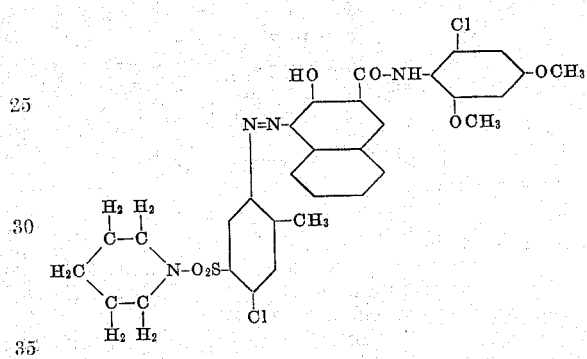

The dyestuff prepared in substance represents a bluish-red powder, soluble in concentrated sulfuric acid with a bluish-violet coloration.

Example 5

*Impregnating bath:*—2.5 grams of 1-(2',3'-hydroxynaphthoylamino) - 2,5-dimethoxy-4-chlorobenzene are pasted with 5 ccs. of Turkey red oil of 50% strength and 7.5 ccs. of aqueous caustic soda lye of 38° Bé. The paste is heated and then dissolved in 150 ccs. of boiling water. By the addition of 150 ccs. of cold water the solution is cooled down to about 50° C., 2.5 ccs. of an aqueous formaldehyde solution of 33% strength are added, and after standing for 5 hours the bath is filled up with water to one litre.

*Developing bath: that of Example 4.*—The dyeing is performed as described in Example 1. Thus is obtained a clear Turkey red shade of very good fastness properties, especially to light. The dyestuff corresponds to the probable formula:

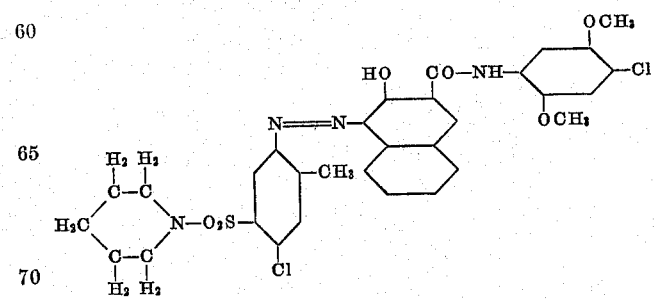

The dyestuff prepared in substance represents a light red powder, soluble in concentrated sulfuric acid with a reddish-violet coloration.

In the following table there are given some combinations and their shades when coupled on the fibre.

| Diazotization component | Coupling component | Shade |
|---|---|---|
| 4-amino-1,3-dimethylbenzene-6-sulfonic acid-ethyl-cyclohexylamide | 1-(2',3'-hydroxynaphthoylamino)-: 2-methyl-4-methoxybenzene | Clear scarlet. |
| 4-amino-1,3-dichlorobenzene-6-sulfonic acid-diethylamide | 2-methoxybenzene | Yellowish-red. |
| 4-amino-1,3-dichlorobenzene-6-sulfonic acid-diethylamide | 2,5-dimethoxybenzene | Scarlet. |
| 4-amino-1,3-dichlorobenzene-6-sulfonic acid-diethylamide | 2-methoxy-4-chlorobenzene | Scarlet. |
| 4-amino-1,3-dichlorobenzene-6-sulfonic acid-diethylamide | 2,5-dimethoxy-4-chlorobenzene | Yellowish scarlet. |
| 4-amino-1,3-diethoxybenzene-6-sulfonic acid-methylbenzylamide | 2-methyl-4-methoxy | Bordeaux. |
| 4-amino-1,3-dimethoxybenzene-6-sulfonic acid-ethyl-cyclohexylamide | 2,4-dimethoxy-5-chlorobenzene | Wine red. |
| 4-amino-1,3-dimethoxybenzene-6-sulfonic acid-piperidide | 2-methyl-4-methoxybenzene | Clear Bordeaux to a reddish-violet. |
| 4-amino-1-chloro-3-methoxybenzene-6-sulfonic acid-dimethylamide | 2-methyl-4-methoxybenzene | Bordeaux. |
| 4-amino-1-chloro-3-methoxybenzene-6-sulfonic acid-dimethylamide | 1-(2',3'-hydroxynaphthoylamino)-: 3-methyl-4-methoxybenzene | Bluish-red. |
| 4-amino-1-chloro-3-methylbenzene-6-sulfonic acid-diethylamide | 2,5-dimethoxybenzene | Clear scarlet. |
| 4-amino-1-methoxy-3-methylbenzene-6-sulfonic acid-diethylamide | 2,4-dimethoxy-5-chlorobenzene | Clear bluish-red. |
| 4-amino-1,3-dimethoxybenzene-6-sulfonic acid-ethyl-phenylamide | 2,4-dimethoxy-5-chlorobenzene | Wine red |

I claim:
1. Waterinsoluble azodyestuffs of the general formula:

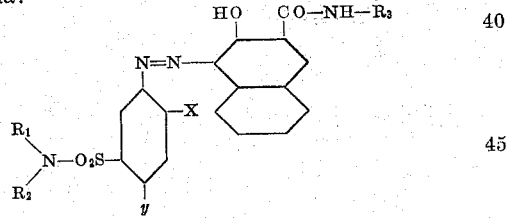

wherein $R_1$ stands for a radical of the group consisting of alkyl and aryl and $R_2$ stands for a radical of the group consisting of alkyl, aryl, aralkyl and cyclohexyl or the group—

stands for the radical of a hydrogenated ring system containing nitrogen, $R_3$ stands for an aromatic nucleus containing as substituent at least an alkoxy group, and X and $y$ stand for substituents selected from the group consisting of halogen, methyl, and alkoxy, yielding, when produced on the fibre, generally orange to Bordeaux shades of good fastness properties.

2. Waterinsoluble azodyestuffs of the general formula:

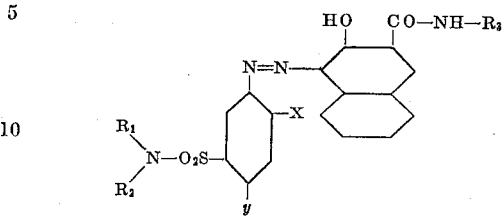

wherein $R_1$ stands for a radical of the group consisting of alkyl and aryl and $R_2$ stands for a radical of the group consisting of alkyl, aryl, aralkyl and cyclohexyl, or the group—

stands for the radical of a hydrogenated ring system containing nitrogen, $R_3$ stands for a benzene nucleus containing as substituent at least an alkoxy group, and X and y stand for substituents selected from the group consisting of halogen, methyl, and alkoxy, yielding, when produced on the fibre, generally orange to Bordeaux shades of good fastness properties.

3. Waterinsoluble azodyestuffs of the general formula:

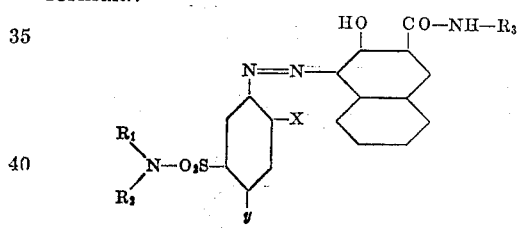

wherein $R_1$ stands for a radical of the group consisting of alkyl and aryl, and $R_2$ stands for a radical of the group consisting of alkyl, aryl, aralkyl and cyclohexyl, or the group—

stands for the radical of a hydrogenated ring system containing nitrogen, $R_3$ stands for a benzene nucleus being substituted by substituents selected from the group consisting of alkoxy, alkyl, and halogen in such a manner that at least an alkoxy group is present as substituent and X and y stand for substituents selected from the group consisting of halogen, methyl and alkoxy, yielding, when produced on the fibre, generally orange to Bordeaux shades of good fastness properties.

4. The waterinsoluble azodyestuff of the following formula:

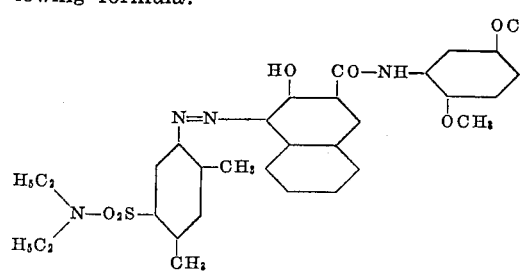

yielding, when produced on the fibre, clear yellowish-red shades of good fastness to light, combined with an excellent fastness to chlorine, washing and boiling in aqueous soda and aqueous caustic soda solution.

5. Fibre dyed with a dyestuff as claimed in claim 1.

6. Fibre dyed with a dyestuff as claimed in claim 2.

7. Fibre dyed with a dyestuff as claimed in claim 3.

8. Fibre dyed with the dyestuff as claimed in claim 4.

WILHELM LAMBERZ.